UNITED STATES PATENT OFFICE.

FRANK W. WOOD, OF INDIANAPOLIS, INDIANA.

PROCESS OF MANUFACTURING PNEUMATIC TIRES.

SPECIFICATION forming part of Letters Patent No. 571,820, dated November 24, 1896.

Application filed August 9, 1895. Serial No. 558,773. (No specimens.)

*To all whom it may concern:*

Be it known that I, FRANK W. WOOD, a citizen of the United States, residing at Indianapolis, in the county of Marion and State of Indiana, have invented certain new and useful Improvements in Processes of Manufacturing Pneumatic Tires, of which the following is a specification.

Heretofore the methods employed in the manufacture of pneumatic tires or similar tubes has involved the use of mandrels, molds, or forming-wheels, all of which have rendered such manufacture comparatively expensive. Especially is this true when it is remembered that the tires have required to be firmly wrapped and held on the supporting structure, or firmly forced against the inside of a tubular mold, to secure homogeneity and efficient vulcanization by the old methods.

The object of my invention is to dispense with these comparatively expensive appliances and produce the tire by simpler and cheaper methods. I have discovered that by expending somewhat more labor in the building up of the structure of the tube than has heretofore been employed the parts can be so firmly united or incorporated together as to permit of vulcanization without the use of any supporting structure or any binding or wrapping of the tire, but that, on the contrary, the tubes so formed can be laid loosely on any convenient supporting device and introduced into the vulcanizing-chamber and there vulcanized, producing a perfect tire without the expensive preparation heretofore required.

In carrying out my invention I take the sheets of rubber and fabric (which have first been cut to the proper width substantially equal to the circumference of the tire or tube to be formed) and lay them together in much the same order and arrangement as is common, but instead of depending upon their inherent adhesive qualities for the adhesion of the various layers I force them into engagement with each other by working and kneading with considerable pressure the various layers until they become firmly united, and I prefer to use small rollers, operated by hand, as the means for working and kneading and applying said pressure. The several layers, of course, lap past each other, so that the opposite edges are tapered, in order to produce a substantially uniform thickness with the rest of the tube when said edges are brought over and lapped together. When the sheets of material for a tube have been assembled, forming a "tire-blank," I first lap the edges thereof over upon each other, and then I force these edges together by the working and kneading process by means of the small rollers by hand, the same as above described as the method by which the individual sheets were forced together.

To more conveniently maintain the uniform width or diameter of the tire, I prefer to employ a simple strap guide of the proper width and fold the blank over it, drawing the strap along around the tire from time to time as the process of uniting proceeds, and finally withdrawing it altogether just before the point of commencement is reached and uniting the few remaining inches in the same manner, but without mechanical guide, which can be done accurately enough by persons of reasonable skill. The strap or mechanical guide may be of any form desired, either internal or external, or can be dispensed with altogether by skilled operatives, but of course the work cannot be carried on so rapidly where no guide is employed. I have discovered that tubes formed in this manner, with the layers all thoroughly united and incorporated together by this kneading process, are sufficiently homogeneous that the tubes will vulcanize properly without any mandrel or former of any kind and that they can be introduced directly into the vulcanizer without further preparation, when by the ordinary process of vulcanization perfect tires can be produced ready for use.

When it is remembered that the forms upon which tires are usually vulcanized cost approximately fifteen dollars each and that the cloth wrappings used upon said tires require frequent renewal, at considerable expense, it will easily be seen that the dispensing with all such appliances, especially in a large factory where large numbers of tires are made, is a matter of great importance.

Tires produced in accordance with my process may be hung loosely on any suitable support, or laid loosely on whatever is suitable to support them, without being placed upon any forming or compressing appliance whatever. A favorite plan of mine is to provide cheap metal pans partially filled with powdered soapstone, into which the tires may be loosely thrown, but this is not essential to the carrying out of my invention.

Having thus fully described my said invention, what I claim as new, and desire to secure by Letters Patent, is—

That process of manufacturing rubber tubes or tires which consists in first preparing the sheet-rubber and fabric of the proper width and size, building up a flat tire-blank of layers of said material arranged with the edge of one layer projecting beyond the edge of the next, said several layers being united to each other by kneading, then folding said blank to bring said edges together and lap the projecting edges of the layers, and then uniting said edges by kneading as the layers were first united, and finally vulcanizing said tires or tubes by the usual process, substantially as set forth.

In witness whereof I have hereunto set my hand and seal, at Indianapolis, Indiana, this 5th day of August, A. D. 1895.

FRANK W. WOOD. [L. S.]

Witnesses:
 H. D. NEALY,
 JAMES A. WALSH.